US012548889B2

(12) United States Patent
Liao et al.

(10) Patent No.: US 12,548,889 B2
(45) Date of Patent: Feb. 10, 2026

(54) LOW FREQUENCY RADIATION UNIT, ANTENNA, MULTI-FREQUENCY SHARED ANTENNA, AND FUSION ANTENNA ARCHITECTURE

(71) Applicant: ZTE Corporation, Shenzhen (CN)

(72) Inventors: Ruikang Liao, Shenzhen (CN); Li Bu, Shenzhen (CN); Te Shao, Shenzhen (CN); Rongli Wang, Shenzhen (CN); Shengwei Kong, Shenzhen (CN); Xigang Xiong, Shenzhen (CN); Shuiping Liu, Shenzhen (CN); Xiang Gao, Shenzhen (CN); Lei Sun, Shenzhen (CN); Mingding Li, Shenzhen (CN); Zhibin Lin, Shenzhen (CN); Can Fu, Shenzhen (CN); Zhanfu Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 30 days.

(21) Appl. No.: 18/705,011

(22) PCT Filed: Oct. 9, 2022

(86) PCT No.: PCT/CN2022/124214

§ 371 (c)(1),
(2) Date: Apr. 26, 2024

(87) PCT Pub. No.: WO2023/093316

PCT Pub. Date: Jun. 1, 2023

(65) Prior Publication Data

US 2024/0421473 A1 Dec. 19, 2024

(30) Foreign Application Priority Data

Nov. 23, 2021 (CN) ........................ 202111398163.6

(51) Int. Cl.
*H01Q 1/24* (2006.01)
*H01Q 1/12* (2006.01)
(Continued)

(52) U.S. Cl.
CPC ........... *H01Q 1/246* (2013.01); *H01Q 1/1207* (2013.01); *H01Q 1/521* (2013.01); *H01Q 9/285* (2013.01);
(Continued)

(58) Field of Classification Search
CPC ........ H01Q 1/12; H01Q 1/1207; H01Q 1/246; H01Q 1/36; H01Q 1/38; H01Q 1/50;
(Continued)

(56) References Cited

U.S. PATENT DOCUMENTS

2007/0080884 A1 4/2007 Boss et al.
2021/0226344 A1* 7/2021 Wu ...................... H01Q 21/065

FOREIGN PATENT DOCUMENTS

CN 202839949 U 3/2013
CN 205335424 U 6/2016
(Continued)

OTHER PUBLICATIONS

International Search Report for corresponding application PCT/CN2022/124214 filed Oct. 9, 2022; Mail date Dec. 12, 2022.
(Continued)

*Primary Examiner* — Robert Karacsony
(74) *Attorney, Agent, or Firm* — CANTOR COLBURN LLP

(57) ABSTRACT

Provided in the embodiments of the present disclosure are a low frequency radiation unit, an antenna, a multi-frequency shared antenna, and a fusion antenna architecture. The low frequency radiation unit is disposed on a side of a metal reflection plate, and includes a Printed Circuit Board (PCB) dielectric plate 10, a medium support frame 70, a coaxial
(Continued)

cable 80, and metal radiators provided on a front side and back side of 10. 70 is connected to the metal radiators, and is configured to support the metal radiators. 80 is disposed on 70, is connected to the metal radiators, and feeds the metal radiators. Such that a 4G low frequency antenna is flexibly disposed above a 5G high frequency antenna, thereby avoiding interference of Balun with the 5G high frequency antenna; and low mutual coupling is achieved, such that internal space of an antenna is saved.

19 Claims, 5 Drawing Sheets

(51) Int. Cl.

| | |
|---|---|
| ***H01Q 1/52*** | (2006.01) |
| ***H01Q 9/28*** | (2006.01) |
| ***H01Q 19/10*** | (2006.01) |
| ***H01Q 21/06*** | (2006.01) |
| ***H01Q 21/26*** | (2006.01) |
| ***H01Q 25/00*** | (2006.01) |

(52) U.S. Cl.
CPC ......... *H01Q 19/108* (2013.01); *H01Q 21/062* (2013.01); *H01Q 21/26* (2013.01); *H01Q 25/001* (2013.01)

(58) Field of Classification Search
CPC .......... H01Q 1/52; H01Q 1/521; H01Q 1/523; H01Q 5/42; H01Q 9/28; H01Q 9/285; H01Q 19/108; H01Q 21/062; H01Q 21/26; H01Q 21/28; H01Q 25/00; H01Q 25/001; H01Q 25/002; H01Q 1/1221; H01Q 5/40; H01Q 5/48; H01Q 5/49
See application file for complete search history.

(56) References Cited

FOREIGN PATENT DOCUMENTS

| | | | |
|---|---|---|---|
| CN | 210576472 | U | 5/2020 |
| EP | 3852193 | A1 | 7/2021 |
| WO | 2021194832 | A1 | 9/2021 |

OTHER PUBLICATIONS

European Search Report for corresponding application EP22897401; Dated Jan. 27, 2025.

* cited by examiner

LOW FREQUENCY RADIATION UNIT, ANTENNA, MULTI-FREQUENCY SHARED ANTENNA, AND FUSION ANTENNA ARCHITECTURE

CROSS-REFERENCE TO RELATED APPLICATION

The present disclosure is a national stage filing under 35 U.S.C. § 371 of international application number PCT/CN2022/124214, filed Oct. 9, 2022, which claims priority to Chinese Patent Application No. 202111398163.6 filed on Nov. 23, 2021 and entitled "Low Frequency Radiation Unit, Antenna, Multi-Frequency Shared Antenna, and Fusion Antenna Architecture", the disclosure of which is hereby incorporated by reference in its entirety.

TECHNICAL FIELD

Embodiments of the present disclosure relate to the field of antennas, and specifically to a low frequency radiation unit, an antenna, a multi-frequency shared antenna, and a fusion antenna architecture.

BACKGROUND

With the development of the communication industry, in the current environment of coexistence of 4G and 5G networks, requirements for multi-frequency antennas is increasing, the requirements for performance indicators are also getting higher and higher, and 4G being compatible with 5G has become the trend of multi-frequency antenna technology development and an inevitable trend. Furthermore, in order to optimize resource configuration and save site location and antenna feeder resources, low-profile and miniaturized multi-frequency antennas can better meet market requirements.

The related technology proposes to nest a 4G low frequency base station antenna with a 5G high frequency base station antenna, i.e., part of the array elements of a second antenna system 4G located at a lower end are nested in a first antenna system 5G Massive MIMO antenna array. However, during implementation of the above solution, the coupling between array element Balun of the second antenna system 4G and an array element of the first antenna system 5G nested in the second antenna system is relatively strong, seriously affecting the radiation performance indexes of a 5G antenna such as wave width, front-to-back ratio, and side lobe, as well as circuit performance indexes of standing waves and isolation degrees.

In views of the problem of strong coupling between the array element Balun of the second antenna system 4G and the array element of the first antenna system 5G nested in the second antenna system in the related art, which seriously affects the radiation performance indexes of a 5G antenna such as wave width, front-to-back ratio, and side lobe, as well as circuit performance indexes of standing waves and isolation degrees, no solution has been proposed.

SUMMARY

Embodiments of the present disclosure provide a low frequency radiation unit, an antenna, a multi-frequency shared antenna, and a fusion antenna architecture, to at least solve the problem of strong coupling between array element Balun of a second antenna system 4G and an array element of a first antenna system 5G nested in the second antenna system in the related art, which seriously affects the radiation performance indexes of a 5G antenna such as wave width, front-to-back ratio, and side lobe, as well as circuit performance indexes of standing waves and isolation degrees.

An embodiment of the present disclosure provides a low frequency radiation unit, disposed on a side of a metal reflection plate, and including: a Printed Circuit Board (PCB) dielectric plate 10, a medium support frame 70, a coaxial cable 80, and metal radiators provided on a front side and back side of the PCB dielectric plate 10.

The medium support frame 70 is connected to the metal radiators, and is configured to support the metal radiators.

The coaxial cable 80 is disposed on the medium support frame 70, is connected to the metal radiators, and feeds the metal radiators.

In an exemplary embodiment, the metal radiator includes two pairs of radiation oscillators 20 arranged in a polarization orthogonal manner, a feed piece 31, and a loading line 60 for bandwidth expansion.

The two pairs of radiation oscillators 20 are disposed on the back side of the PCB dielectric plate 10.

The feed pieces 31 are disposed on the front side and back side of the PCB dielectric plate 10. The feed pieces 31 is connected to the coaxial cable 80 by means of soldering.

In an exemplary embodiment, one end of the feed pieces 31 is provided with a metalized through hole 30. The metalized through hole 30 is connected to the coaxial cable 80 by means of soldering.

In an exemplary embodiment, the two pairs of radiation oscillators 20 are printed on the back side of the PCB dielectric plate 10 through photolithography, so as to form ±45° dual-polarized radiation characteristics.

And/or, the two pairs of radiation oscillators 20 are of a structure shaped like a Chinese character "田".

And/or, the two pairs of radiation oscillators 20 are spaced two by two, so as to form a cross-shaped gap 50.

In an exemplary embodiment, the two pairs of radiation oscillators 20 respectively are a first radiation oscillator 21, a second radiation oscillator 22, a third radiation oscillator 23, and a fourth radiation oscillator 24. The first radiation oscillator 21 and the third radiation oscillator 23 are in the same polarization. The second radiation oscillator 22 and the fourth radiation oscillator 24 are in the same polarization.

In an exemplary embodiment, the medium support frame 70 includes an annular support base 71 and a fixed frame 72. The annular support base 71 is located vertically directly below the metal radiator. The annular support base 71 is connected to the metal radiator.

In an exemplary embodiment, the fixed frame 72 is provided with a guide slot 74 and a clamping slot 75. The clamping slot 75 is configured to be sided with a side of the metal reflection plate.

The coaxial cable 80 is connected to the metal radiator after running through the guide slot 74.

In an exemplary embodiment, the annular support base 71 is provided with a positioning column 73. The positioning column 73 fixes the PCB dielectric plate 10 and the metal radiator by means of a through hole 40 provided on the PCB dielectric plate 10.

In an exemplary embodiment, one end of the medium support frame 70 is located directly below the metal radiator, and an L-shaped broken line segment of the other end that extends toward a side of the metal radiator is fixed with the side of the metal reflection plate.

In an exemplary embodiment, one end of the coaxial cable 80 is configured to perform feeding by means of soldering with the feed piece 31, and the other end is configured to be connected to an input port of a phase shifter of a 4G system.

In an exemplary embodiment, the fixed frame 72 is L-shaped.

In an exemplary embodiment, the fixed frame 72 consists of a plurality of broken line segments. There is a set gap between the coaxial cable 80 routing on the fixed frame 72 and the metal radiator on the PCB dielectric plate 10.

Another embodiment of the present disclosure further provides an antenna, including a metal reflection plate 100 and at least two low frequency radiation units described above. The low frequency radiation units are disposed on the metal reflection plate 100.

In an exemplary embodiment, the low frequency radiation unit is fixed on a side 101 of the metal reflection plate 100 through a clamping slot 75 of a medium support frame 70. A coaxial cable 80 routes on the side 101 of the metal reflection plate 100 through a guide slot 74.

Another embodiment of the present disclosure further provides a multi-frequency shared antenna, including a metal reflection plate 100, a plurality of high frequency radiation units 200 all disposed on the metal reflection plate 100, and at least two low frequency radiation units described above. The low frequency radiation units are disposed on a side of the metal reflection plate 100.

In an exemplary embodiment, the plurality of high frequency radiation units 200 are arranged in a plurality of arrays.

In an exemplary embodiment, at least one high frequency radiation unit 200 is covered blow the low frequency radiation unit.

Another embodiment of the present disclosure further provides a fusion antenna architecture, including an independent detachable 5G active antenna unit and a 4G passive antenna. At least two low frequency radiation units described above are disposed above an antenna of the 5G active antenna unit, and reflective faces of the low frequency radiation units share a reflective face of the antenna of the 5G active antenna unit.

The low frequency radiation unit of the embodiments of the present disclosure is disposed on the side of the metal reflection plate, and includes the PCB dielectric plate 10, the medium support frame 70, the coaxial cable 80, and the metal radiators provided on the front side and back side of the PCB dielectric plate 10. The medium support frame 70 is connected to the metal radiators, and is configured to support the metal radiators. The coaxial cable 80 is disposed on the medium support frame 70, is connected to the metal radiators, and feeds the metal radiators. In this way, the problem of strong coupling between array element Balun of a second antenna system 4G and an array element of a first antenna system 5G nested in the second antenna system in the related art, which seriously affects the radiation performance indexes of a 5G antenna such as wave width, front-to-back ratio, and side lobe, as well as circuit performance indexes of standing waves and isolation degrees may be solved, such that a 4G low frequency antenna is flexibly disposed above a 5G high frequency antenna, thereby avoiding interference of Balun with the 5G high frequency antenna; and low mutual coupling is achieved, such that internal space of an antenna is saved.

Figure 1:
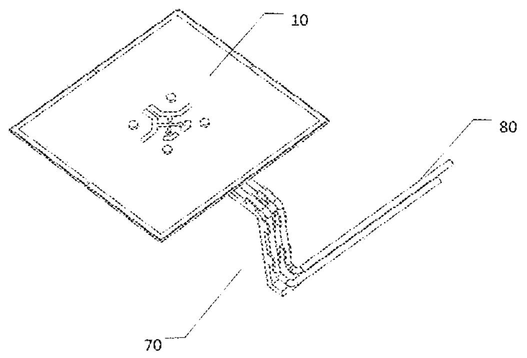
FIG. 1 is a schematic diagram of a low frequency radiation unit according to an embodiment of the present disclosure.

In the drawings, 10—PCB dielectric plate, 70—Medium support frame, 80—Coaxial cable, 60—Loading line, 20—Two pairs of radiation oscillators, 21—First radiation oscillator, 22—Second radiation oscillator, 23—Third radiation oscillator, 24—Fourth radiation oscillator, 31—Feed piece, 30—Metalized through hole, 50—Cross-shaped gap, 71—Annular support base, 72—Fixed frame, 73—Positioning column, 74—Guide slot, 75—Clamping slot, 100—Metal reflection plate, 101—Side, and 200—High frequency radiation unit.

DETAILED DESCRIPTION OF THE EMBODIMENTS

The embodiments of the present disclosure are described below in detail with reference to the drawings and the embodiments.

It is to be noted that terms "first", "second" and the like in the description, claims and the above mentioned drawings of the present disclosure are used for distinguishing similar objects rather than describing a specific sequence or a precedence order.

An embodiment of the present disclosure provides a low frequency radiation unit. FIG. 1 is a schematic diagram of a low frequency radiation unit according to an embodiment of the present disclosure. As shown in FIG. 1, the low frequency radiation unit is disposed on a side of a metal reflection plate, and includes: a PCB dielectric plate 10, a medium support frame 70, a coaxial cable 80, and metal radiators provided on a front side and back side of the PCB dielectric plate 10.

The medium support frame 70 is connected to the metal radiators, and is configured to support the metal radiators.

The coaxial cable 80 is disposed on the medium support frame 70, is connected to the metal radiators, and feeds the metal radiators.

The low frequency radiation unit of the embodiments of the present disclosure is disposed on the side of the metal reflection plate, and includes the PCB dielectric plate 10, the medium support frame 70, the coaxial cable 80, and the metal radiators provided on the front side and back side of the PCB dielectric plate 10. The medium support frame 70 is connected to the metal radiators, and is configured to support the metal radiators. The coaxial cable 80 is disposed on the medium support frame 70, is connected to the metal radiators, and feeds the metal radiators. In this way, the problem of strong coupling between array element Balun of a second antenna system 4G and an array element of a first antenna system 5G nested in the second antenna system in the related art, which seriously affects the radiation performance indexes of a 5G antenna such as wave width, front-to-back ratio, and side lobe, as well as circuit performance indexes of standing waves and isolation degrees may be solved, such that a 4G low frequency antenna is flexibly disposed above a 5G high frequency antenna, thereby avoiding interference of Balun with the 5G high frequency antenna; and low mutual coupling is achieved, such that internal space of an antenna is saved.

Figure 2:
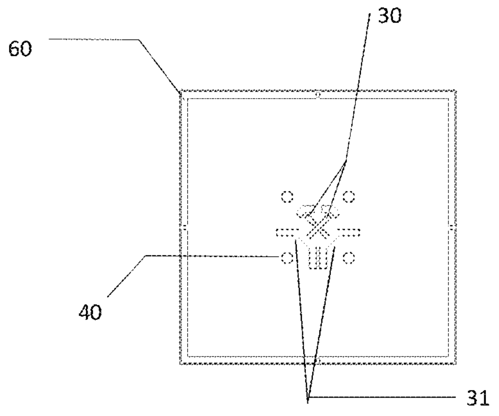
FIG. 2 is a schematic diagram of a front side of a metal radiator according to an embodiment of the present disclosure.
Figure 3:
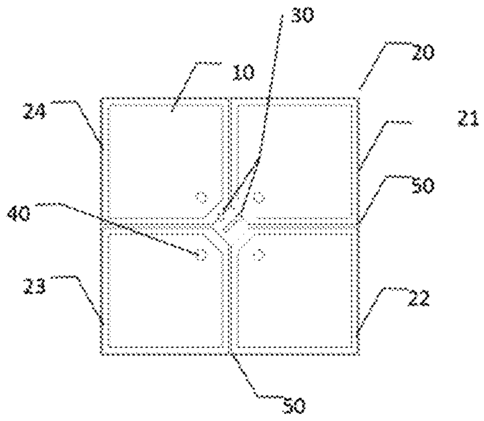
FIG. 3 is a schematic diagram of a back side of a metal radiator according to an embodiment of the present disclosure.

FIG. 2 is a schematic diagram of a front side of a metal radiator according to an embodiment of the present disclosure. As shown in FIG. 2, the metal radiator includes a feed piece 31 and a loading line 60 for bandwidth expansion. FIG. 3 is a schematic diagram of a back side of a metal radiator according to an embodiment of the present disclosure. As shown in FIG. 3, the metal radiator further includes two pairs of radiation oscillators 20 arranged in a polarization orthogonal manner. The two pairs of radiation oscillators 20 are disposed on the back side of the PCB dielectric plate 10. The feed pieces 31 are disposed on the front side and back side of the PCB dielectric plate 10. The feed pieces 31 is connected to the coaxial cable 80 by means of soldering. Further, one end of the feed pieces 31 is provided with a metalized through hole 30. The metalized through hole 30 is connected to the coaxial cable 80 by means of soldering. Optionally, one end of the coaxial cable 80 is configured to perform feeding by means of soldering with the feed piece 31, and the other end is configured to be connected to an input port of a phase shifter of a 4G system. An external conductor of the coaxial cable 80 is soldered on the back-side metal radiator, so as to realize the grounding of the other arm of a half-wave oscillator. It is to be noted that, the metal feed piece 31 are disposed on both front and back sides of the PCB dielectric plate 10. One feed piece at the front-side portion feeds one of the half-wave oscillators, and the other feed piece is connected to the feed piece on the back side of the PCB dielectric plate through a metalized through hole, so as to feed the other half-wave oscillator. This structure not only facilitates the assembly and soldering of the radiation unit, but also effectively reduces the isolation degree of the radiation unit as well as the antenna.

As shown in FIG. 3, the two pairs of radiation oscillators 20 are printed on the back side of the PCB dielectric plate 10 through photolithography, so as to form ±45° dual-polarized radiation characteristics; and/or two pairs of radiation oscillators 20 are of a structure shaped like a Chinese character "田". In an aspect, miniaturization of the radiation unit is facilitated, and in another aspect, transmission of a plurality of antennas of a 5G system covered below a radiation piece is facilitated, such that the mutual coupling between 4G and 5G system networks is reduced. And/or, the two pairs of radiation oscillators 20 are spaced two by two, so as to form a cross-shaped gap 50. Further, the two pairs of radiation oscillators 20 respectively are a first radiation oscillator 21, a second radiation oscillator 22, a third radiation oscillator 23, and a fourth radiation oscillator 24. The first radiation oscillator 21 and the third radiation oscillator 23 are in the same polarization. The second radiation oscillator 22 and the fourth radiation oscillator 24 are in the same polarization. Four radiation oscillators 20 are spaced two by two, so as to form a cross-shaped gap 50. The cross-shaped gap 50 improves an isolation degree of a port between the radiation oscillators 20.

Figure 4:
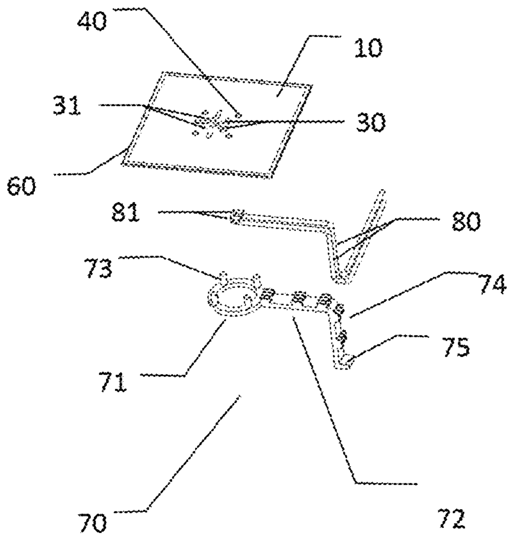
FIG. 4 is a schematic exploded view of a low frequency radiation unit (vertical view) according to an embodiment of the present disclosure.

FIG. 4 is a schematic exploded view of a low frequency radiation unit (vertical view) according to an embodiment of the present disclosure. As shown in FIG. 4, the medium support frame 70 includes an annular support base 71 and a fixed frame 72. The annular support base 71 is located vertically directly below the metal radiator. The annular support base 71 is connected to the metal radiator.

Figure 5:
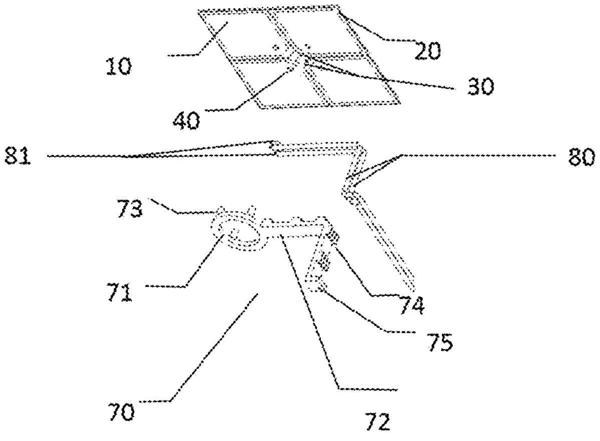
FIG. 5 is a schematic exploded view of a low frequency radiation unit (bottom view) according to an embodiment of the present disclosure.

FIG. 5 is a schematic exploded view of a low frequency radiation unit (bottom view) according to an embodiment of the present disclosure. As shown in FIG. 5, the fixed frame 72 is provided with a guide slot 74 and a clamping slot 75. The clamping slot 75 is configured to be sided with a side of the metal reflection plate. The coaxial cable 80 is connected to the metal radiator after running through the guide slot 74.

Figure 6:
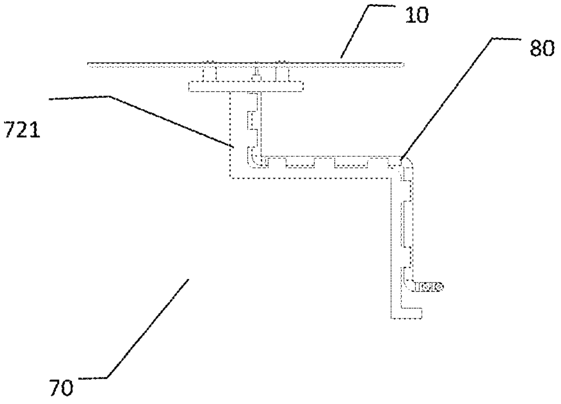
FIG. 6 is a schematic structural diagram of a low frequency radiation unit according to another embodiment of the present disclosure.

As shown in FIGS. 4-5, the annular support base 71 is provided with a positioning column 73. The positioning column 73 fixes the PCB dielectric plate 10 and the metal radiator by means of a through hole 40 provided on the PCB dielectric plate 10. Therefore, the effect of fixing the PCB dielectric plate 10 and the metal radiator printed on the PCB dielectric plate is achieved. Further, one end of the medium support frame 70 is located directly below the metal radiator, and an L-shaped broken line segment of the other end that extends toward a side of the metal radiator is fixed with the side of the metal reflection plate. FIG. 6 is a schematic structural diagram of a low frequency radiation unit according to another embodiment of the present disclosure. As shown in FIG. 6, the fixed frame 72 may specifically be L-shaped. Further, the fixed frame 72 consists of a plurality of broken line segments. There is a set gap between the coaxial cable 80 routing on the fixed frame 72 and the metal radiator on the PCB dielectric plate 10. A height 721 is added to the medium support frame 70, such that it ensures that there is a certain spacing between the coaxial cable 80 and the radiator on the PCB dielectric plate 10. Therefore, the influence of a high frequency current of an outer skin of the coaxial cable 80 on the low frequency radiation unit may be reduced, thereby achieving a decoupling effect, and the low frequency radiation unit is compatible with the bandwidth of a higher frequency. One end of the L-shaped medium support frame (70) is located directly below a metal radiators, and the L-shaped broken line segment of the other end that extends toward the side of the metal radiators is fixed with the side of the metal reflection plate, such that lower space of the low frequency radiation unit is not occupied, and the sharing of multi-frequency antennas can be better realized.

Figure 7:
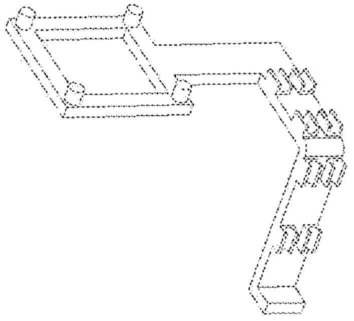
FIG. 7 is a schematic diagram of other structures included in a medium support frame according to an embodiment of the present disclosure.

The above description is merely partial implementations of the present disclosure, and it should be noted that persons of ordinary skill in the art may also make several improvements and refinements without departing from the principle of the present disclosure. FIG. 7 is a schematic diagram of other structures included in a medium support frame according to an embodiment of the present disclosure. As shown in FIG. 7, the annular support base 71 on the medium support frame 70 is not limited to a circular shape, and may also be a diamond shape, a triangular shape, etc. For ease of layout, the L-shaped fixed frame 72 on the medium support frame 70 may also be bent for a plurality of times according to actual requirements. These improvements and refinements should also be considered to be within the scope of protection of the present disclosure and are not specifically described herein.

Figure 8:
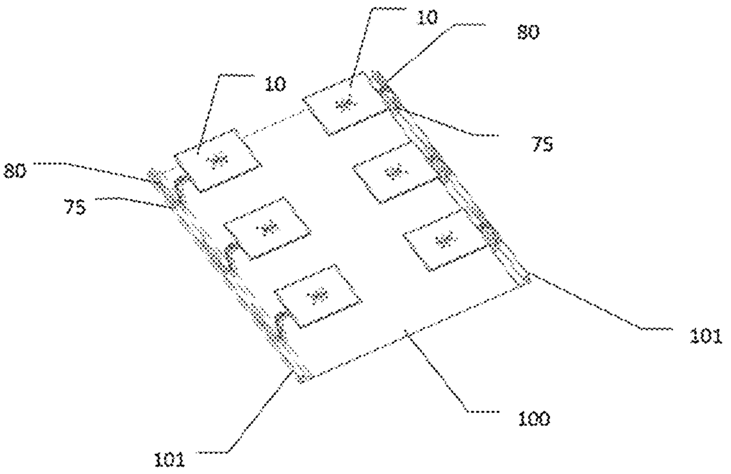
FIG. 8 is a schematic diagram of an antenna using a low frequency radiation unit according to an embodiment of the present disclosure.

An embodiment of the present disclosure further provides an antenna. FIG. 8 is a schematic diagram of an antenna using a low frequency radiation unit according to an embodiment of the present disclosure. As shown in FIG. 8, the antenna includes a metal reflection plate 100 and at least two low frequency radiation units described above. The low frequency radiation units are disposed on the metal reflection plate 100. Further, the low frequency radiation unit is fixed on a side 101 of the metal reflection plate 100 through a clamping slot 75 of a medium support frame 70. A coaxial cable 80 routes on the side 101 of the metal reflection plate 100 through a guide slot 74, such that the lower space of the low frequency radiation unit is further saved.

Figure 9:
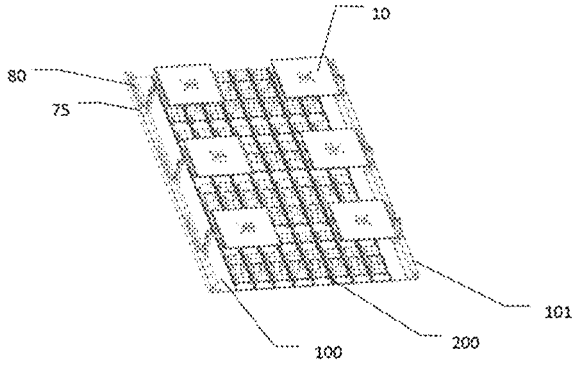
FIG. 9 is a schematic diagram of a multi-frequency shared antenna using a low frequency radiation unit according to an embodiment of the present disclosure.
Figure 10:
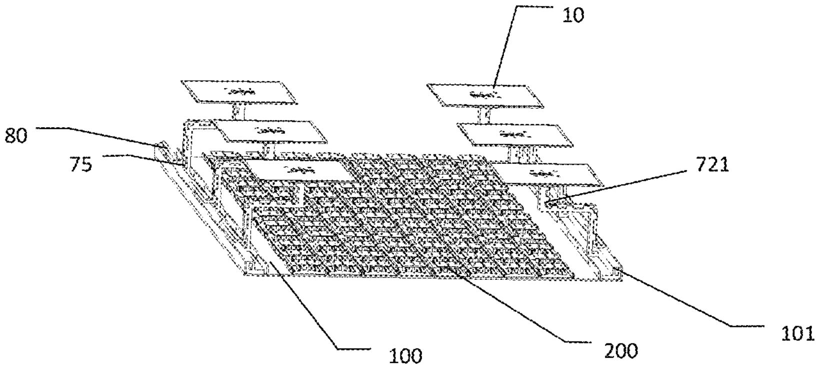
FIG. 10 is a schematic diagram of another example multi-frequency shared antenna using a low frequency radiation unit according to an embodiment of the present disclosure.

Another embodiment of the present disclosure further provides a multi-frequency shared antenna. FIG. 9 is a schematic diagram of a multi-frequency shared antenna using a low frequency radiation unit according to an embodiment of the present disclosure. As shown in FIG. 9, the multi-frequency shared antenna includes a metal reflection plate 100, a plurality of high frequency radiation units 200 all disposed on the metal reflection plate 100, and at least two low frequency 1s radiation units described above. The low frequency radiation units are disposed on a side of the metal reflection plate 100. Further, the plurality of high frequency radiation units 200 are arranged in a plurality of arrays. At least one high frequency radiation unit 200 is covered blow the low frequency radiation unit. In this implementation, because of the use of the low frequency radiation unit, the multi-frequency shared antenna of the present disclosure has the characteristics of being small in size and low in cost. In this embodiment, four high frequency radiation units are nested in each low frequency radiation unit. FIG. 10 is a schematic diagram of another example multi-frequency shared antenna using a low frequency radiation unit according to an embodiment of the present disclosure. As shown in FIG. 10, for ease of layout, the L-shaped fixed frame 72 on the medium support frame 70 may also be bent for a plurality of times according to actual requirements, and is disposed on the side of the metal reflection plate.

Figure 11:
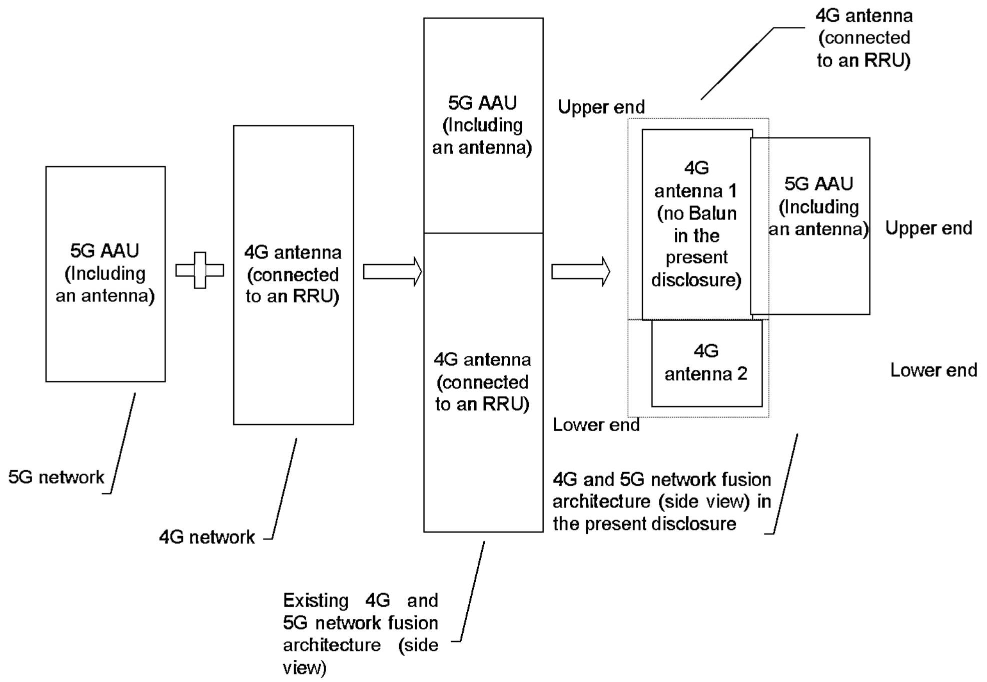
FIG. 11 is a schematic diagram of a 4G and 5G network-type fusion architecture using a low frequency radiation unit according to an embodiment of the present disclosure.

An embodiment of the present disclosure further provides a fusion antenna architecture. FIG. 11 is a schematic diagram of a 4G and 5G network-type fusion architecture using a low frequency radiation unit according to an embodiment of the present disclosure. As shown in FIG. 11, the fusion antenna architecture includes an independent detachable 5G active antenna unit and a 4G passive antenna. At least two low frequency radiation units described above are disposed above an antenna of the 5G active antenna unit, and reflective faces of the low frequency radiation units share a reflective face of the antenna of the 5G active antenna unit. There are at least two low frequency radiation units above a 5G AAU antenna, and reflective faces of the low frequency radiation units share a reflective face of the AAU antenna. Through rational array layout and the use of Balun-free low frequency radiation unit provided in the present disclosure, 4G and 5G are fused inside a small size so that the performance of both 4G and 5G network systems can reach the level of separate 4G antennas and 5G antennas.

The low frequency radiation unit in the embodiment of the present disclosure is used and fixedly mounted on the side of the metal reflection plate, such that the lower space of the low frequency radiation unit is not occupied, and the mutual coupling between a 4G system and a 5G system can be effectively reduced, thereby better realizing the sharing of multi-frequency antennas. The 4G and 5G are fused inside a small size so that the performance of both 4G and 5G network systems can reach the level of separate 4G antennas and 5G antennas. Therefore, a multi-standard network fusion architecture is derived, thereby realizing optimization configuration of network site location resources and the miniaturization of a multi-standard network base station.

It is apparent that those skilled in the art should understand that the above-mentioned modules or steps of the present disclosure may be implemented by a general computing device, and may also be gathered together on a single computing device or distributed in network composed of multiple computing devices. The above mentioned modules or steps of the present application may be implemented with program codes executable by the computing device, so that may be stored in a storage device for execution by the computing device, and in some cases, the steps shown or described may be performed in a different sequence than herein, or can be fabricated into individual integrated circuit modules respectively, or multiple modules or steps thereof are fabricated into a single integrated circuit module for implementation. In this way, the present disclosure are not limited to any specific combination of hardware and software.

The above are only the preferred embodiments of the disclosure and are not intended to limit the disclosure. For those skilled in the art, the disclosure may have various modifications and variations. Any modifications, equivalent replacements, improvements and the like made within the principle of the disclosure shall fall within the scope of protection of the present disclosure.

What is claimed is:

1. A low frequency radiation unit, disposed on a side of a metal reflection plate, and comprising: a Printed Circuit Board (PCB) dielectric plate (10), a medium support frame (70), a coaxial cable (80), and metal radiators provided on a front side and back side of the PCB dielectric plate (10), wherein the medium support frame (70) is connected to the metal radiators, and is configured to support the metal radiators; and the coaxial cable (80) is disposed on the medium support frame (70), is connected to the metal radiators, and feeds the metal radiators;

wherein one end of the medium support frame (70) is located directly below the metal radiator, and an L-shaped broken line segment of the other end that extends toward a side of the metal radiator is fixed with the side of the metal reflection plate.

2. The low frequency radiation unit according to claim 1, wherein the metal radiator comprises two pairs of radiation oscillators (20) arranged in a polarization orthogonal manner, a feed piece (31), and a loading line (60) for bandwidth expansion;

the two pairs of radiation oscillators (20) are disposed on the back side of the PCB dielectric plate (10); and the feed pieces (31) are disposed on the front side and back side of the PCB dielectric plate (10), and the feed pieces (31) is connected to the coaxial cable (80) by means of soldering.

3. The low frequency radiation unit according to claim 2, wherein one end of the feed pieces (31) is provided with a metalized through hole (30); and the metalized through hole (30) is connected to the coaxial cable (80) by means of soldering.

4. The low frequency radiation unit according to claim 2, wherein the two pairs of radiation oscillators (20) are printed on the back side of the PCB dielectric plate (10) through photolithography, so as to form ±45° dual-polarized radiation characteristics; and/or the two pairs of radiation oscillators (20) are of a structure shaped like a Chinese character "田"; and/or the two pairs of radiation oscillators (20) are spaced two by two, so as to form a cross-shaped gap (50).

5. The low frequency radiation unit according to claim 2, wherein the two pairs of radiation oscillators (20) respectively are a first radiation oscillator (21), a second radiation oscillator (22), a third radiation oscillator (23), and a fourth radiation oscillator (24); the first radiation oscillator (21) and the third radiation oscillator (23) are in the same polarization; and the second radiation oscillator (22) and the fourth radiation oscillator (24) are in the same polarization.

6. The low frequency radiation unit according to claim 1, wherein the medium support frame (70) comprises an annular support base (71) and a fixed frame (72); the annular support base (71) is located vertically directly below the metal radiator; and the annular support base (71) is connected to the metal radiator.

7. The low frequency radiation unit according to claim 6, wherein the fixed frame (72) is provided with a guide slot (74) and a clamping slot (75), and the clamping slot (75) is configured to be sided with a side of the metal reflection plate; and the coaxial cable (80) is connected to the metal radiator after running through the guide slot (74).

8. The low frequency radiation unit according to claim 6, wherein the annular support base (71) is provided with a positioning column (73); and the positioning column (73) fixes the PCB dielectric plate (10) and the metal radiator by means of a through hole (40) provided on the PCB dielectric plate (10).

9. The low frequency radiation unit according to claim 2, wherein one end of the coaxial cable (80) is configured to perform feeding by means of soldering with the feed piece (31), and the other end is configured to be connected to an input port of a phase shifter of a 4G system.

10. The low frequency radiation unit according to claim 6, wherein the fixed frame (72) is L-shaped.

11. The low frequency radiation unit according to claim 6, wherein the fixed frame (72) consists of a plurality of broken line segments; and there is a set gap between the coaxial cable (80) routing on the fixed frame (72) and the metal radiator on the PCB dielectric plate (10).

12. An antenna, comprising a metal reflection plate (100) and at least two low frequency radiation units as claimed in claim 1, wherein the low frequency radiation units are disposed on the metal reflection plate (100).

13. The antenna according to claim 12, wherein the low frequency radiation unit is fixed on a side (101) of the metal reflection plate (100) through a clamping slot (75) of a medium support frame (70); a coaxial cable (80) routes on the side (101) of the metal reflection plate (100) through a guide slot (74).

14. A multi-frequency shared antenna, comprising a metal reflection plate (100), a plurality of high frequency radiation units (200) all disposed on the metal reflection plate (100), and at least two low frequency radiation units as claimed in claim 1, wherein the low frequency radiation units are disposed on a side of the metal reflection plate (100).

15. The multi-frequency shared antenna according to claim 14, wherein the plurality of high frequency radiation units (200) are arranged in a plurality of arrays.

16. The multi-frequency shared antenna according to claim 14, wherein at least one high frequency radiation unit (200) is covered blow the low frequency radiation unit.

17. A fusion antenna architecture, comprising an independent detachable 5G active antenna unit and a 4G passive antenna, wherein at least two low frequency radiation units as claimed in claim 1 are disposed above an antenna of the 5G active antenna unit, and reflective faces of the low frequency radiation units share a reflective face of the antenna of the 5G active antenna unit.

18. A fusion antenna architecture, comprising an independent detachable 5G active antenna unit and a 4G passive antenna, wherein at least two low frequency radiation units as claimed in claim 2 are disposed above an antenna of the 5G active antenna unit, and reflective faces of the low frequency radiation units share a reflective face of the antenna of the 5G active antenna unit.

19. A fusion antenna architecture, comprising an independent detachable 5G active antenna unit and a 4G passive antenna, wherein at least two low frequency radiation units as claimed in claim 3 are disposed above an antenna of the 5G active antenna unit, and reflective faces of the low frequency radiation units share a reflective face of the antenna of the 5G active antenna unit.

* * * * *